US008966209B2

(12) United States Patent
Post et al.

(10) Patent No.: US 8,966,209 B2
(45) Date of Patent: Feb. 24, 2015

(54) EFFICIENT ALLOCATION POLICIES FOR A SYSTEM HAVING NON-VOLATILE MEMORY

(75) Inventors: Daniel J. Post, Campbell, CA (US); Brian Sutton, San Jose, CA (US)

(73) Assignee: Apple Inc., Cupertino, CA (US)

( * ) Notice: Subject to any disclaimer, the term of this patent is extended or adjusted under 35 U.S.C. 154(b) by 546 days.

(21) Appl. No.: 12/861,703

(22) Filed: Aug. 23, 2010

(65) Prior Publication Data
US 2012/0047316 A1 Feb. 23, 2012

(51) Int. Cl.
G06F 12/00 (2006.01)
G06F 12/02 (2006.01)
G06F 3/06 (2006.01)

(52) U.S. Cl.
CPC .......... *G06F 12/0246* (2013.01); *G06F 3/0608* (2013.01); *G06F 3/061* (2013.01); *G06F 3/064* (2013.01); *G06F 3/0688* (2013.01); *G06F 2212/7202* (2013.01)
USPC ........................... 711/170; 711/202; 711/209

(58) Field of Classification Search
USPC .......................................... 711/170, 202, 209
See application file for complete search history.

(56) References Cited

U.S. PATENT DOCUMENTS 7,809,919 B2 * 10/2010 Thompson .................... 711/201
2003/0161186 A1 * 8/2003 Aasheim et al. ......... 365/185.29
2006/0143426 A1 * 6/2006 Wu ............................... 711/203
2007/0150689 A1 * 6/2007 Pandit et al. .................. 711/170
2007/0288255 A1 * 12/2007 Cai et al. ........................ 705/1
2008/0307192 A1 * 12/2008 Sinclair et al. ............... 711/218
2010/0228940 A1 * 9/2010 Asnaashari et al. .......... 711/170

OTHER PUBLICATIONS

Jung, et al., "Superblock FTL: A Superblock-Based Flash Translation Layer with a Hybrid Address Translation Scheme" in ACM Transactions on Embedded Computing Systems, vol. 9, No. 4, Article 40, Mar. 2010.
Kang, et al., "A Superblock-based Flash Translation Layer for NAND Flash Memory" in EMSOFT'06, Oct. 2006, Seoul, Korea.
Park, et al., "Sub-grouped superblock management for high-performance flash storages" in IEICE Electronics Express, vol. 6, No. 6, Mar. 2009, pp. 297-303.

* cited by examiner

*Primary Examiner* — Gurtej Bansal
(74) *Attorney, Agent, or Firm* — Van Court & Aldridge LLP

(57) ABSTRACT

Systems and methods are disclosed for efficient allocation policies for a system having non-volatile memory. A file system allocator of the system can be configured to allocate memory regions that are aligned with one or more logical blocks of a logical space (e.g., one or more super block-aligned regions). In some embodiments, the file system allocator can monitor the number of free sectors corresponding to each logical block. In other embodiments, the file system allocator can monitor a ratio of free space to total space corresponding to each logical block. The file system allocator can select a logical block based at least in part on the number of free sectors of the logical block. In some cases, the file system allocator can allocate the free sectors of the logical block in a sequential order.

22 Claims, 7 Drawing Sheets

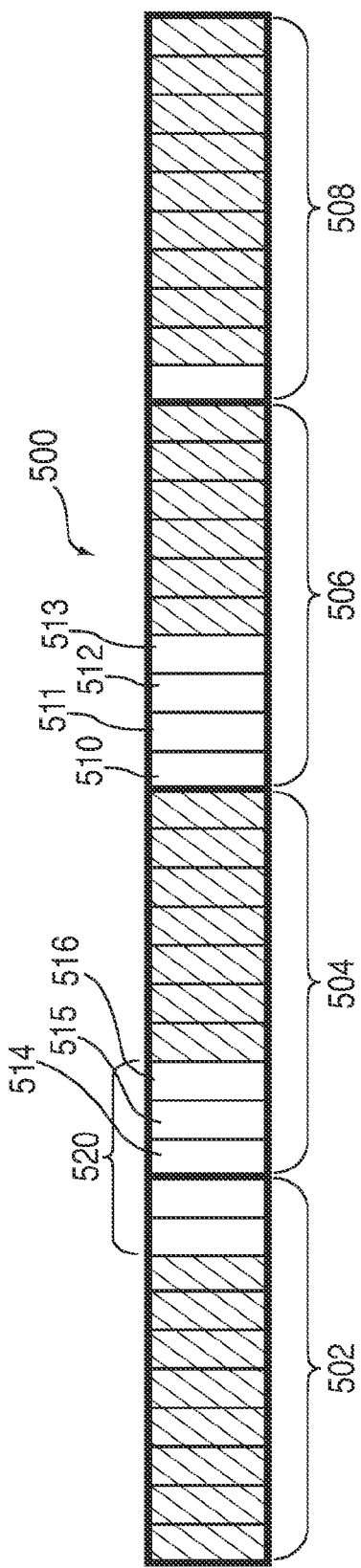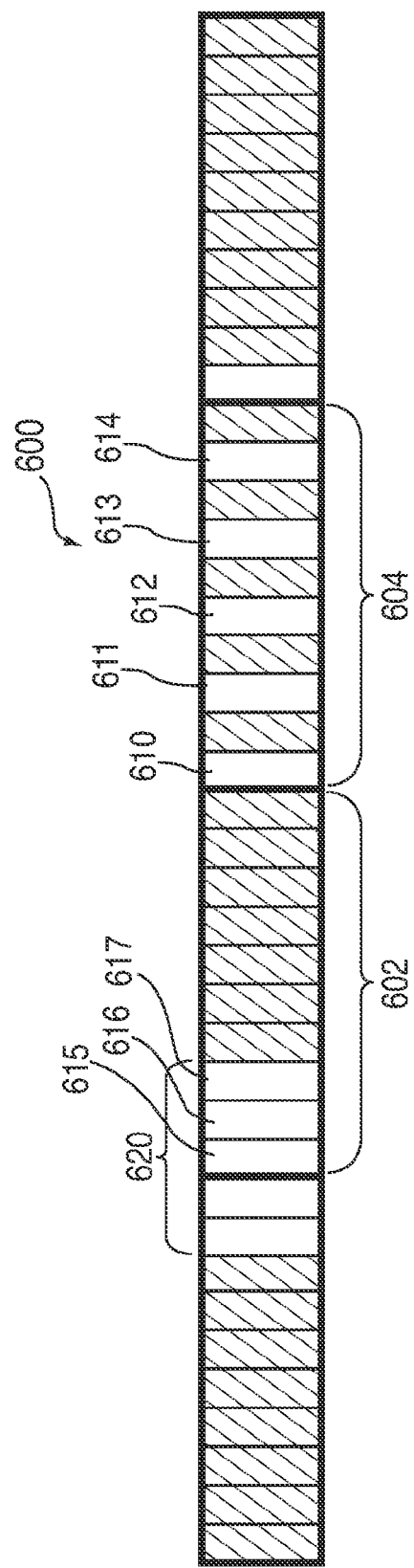

EFFICIENT ALLOCATION POLICIES FOR A SYSTEM HAVING NON-VOLATILE MEMORY

FIELD OF THE INVENTION

This can relate to efficient allocation policies for a system having non-volatile memory.

BACKGROUND OF THE DISCLOSURE

NAND flash memory, as well as other types of non-volatile memories ("NVMs"), are commonly used for mass storage. For example, electronic devices such as portable media players or cellular telephones often include raw flash memory or a flash card to store music, videos, and other media.

Some electronic devices can have a file system for managing files. Generally, the file system is capable of managing the data associated with files as clusters of data. For example, in response to receiving a request to store data associated with a file, the file system may allocate at least a portion of the largest contiguous string of free logical space (e.g., free clusters) to the file. Although such an approach is efficient for a hard-drive-based system where contiguous writes to the hard drive are preferred, this approach can create efficiency problems for a system having a flash memory.

In particular, the NVM may include one or more blocks (e.g., one or more super blocks), which can be associated with a particular logical block in a logical space. In order to write new data to a logical block, merge operations may need to be performed on one or more associated blocks. Because merge operations can decrease the efficiency of writes, performing the writes without regard to the underlying logical block boundaries can negatively impact system efficiency and increase memory wear.

SUMMARY OF THE DISCLOSURE

Systems and methods are disclosed for efficient allocation policies for a system having non-volatile memory ("NVM"). A file system allocator of the system can be configured to be aware of logical block boundaries. For example, the file system allocator can be configured to allocate memory regions aligned with one or more logical blocks of a logical space (e.g., one or more super block-aligned regions) regardless of the data fragmentation within each logical block. As a result, the number of logical blocks that will eventually need to be merged can be limited, and the number of memory operations that may need to be performed is likewise reduced. This can lead to both faster writes and decreased memory wear over time.

In some embodiments, the file system allocator can monitor the number of free sectors corresponding to each logical block in the logical space (e.g., in a free_sectors array). In other embodiments, the file system allocator can monitor a ratio of free space to total space corresponding to each logical block in the logical space (e.g., in a ratio_space array).

In some embodiments, the file system allocator may receive a request to store data associated with a file in the NVM. In response to receiving the request, the file system allocator can select a logical block based at least in part on a number of free sectors of the logical block. For example, based on the free_sectors array, the file system allocator can select a logical block with the largest number of free sectors. As another example, based on the ratio_space array, the file system allocator can select a logical block with the largest ratio of free space to total space.

The file system allocator can allocate the free sectors of the logical block to the file in a sequential order. For example, the file system allocator can allocate the free sectors in a forward sequential order based on the logical address of each free sector.

After allocating a free sector of the logical block to the file, the file system allocator can determine if additional free sectors are needed. If the file system allocator determines that additional free sectors are needed, the file system allocator can then determine if a new logical block needs to be selected. For example, the file system allocator can determine that a new logical block needs to be selected based on determining that an allocation point has reached a pre-determined value (e.g., the number of free sectors in the logical block). As another example, the file system allocator can determine that a new logical block needs to be selected based on detecting an end of the logical block. As yet another example, the file system allocator can determine that a new logical block needs to be selected based on detecting that there are no more free space in the logical block (e.g., by searching a block bitmap or a file allocation table ("FAT")).

If the file system allocator determines that a new logical block needs to be selected, the file system allocator can select a new logical block that has the largest number of free sectors. The file system allocator can then allocate a first free sector of the new logical block to the file. If the file system allocator instead determines that a new logical block does not need to be selected, the file system allocator can allocate the next sequential free sector of the logical block to the file.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which:

FIG. 5 is an illustrative graphical view of memory regions in a logical space in accordance with various embodiments of the invention;

FIG. 6 is another illustrative graphical view of memory regions in a logical space in accordance with various embodiments of the invention;

DETAILED DESCRIPTION OF THE DISCLOSURE

Figure 1:
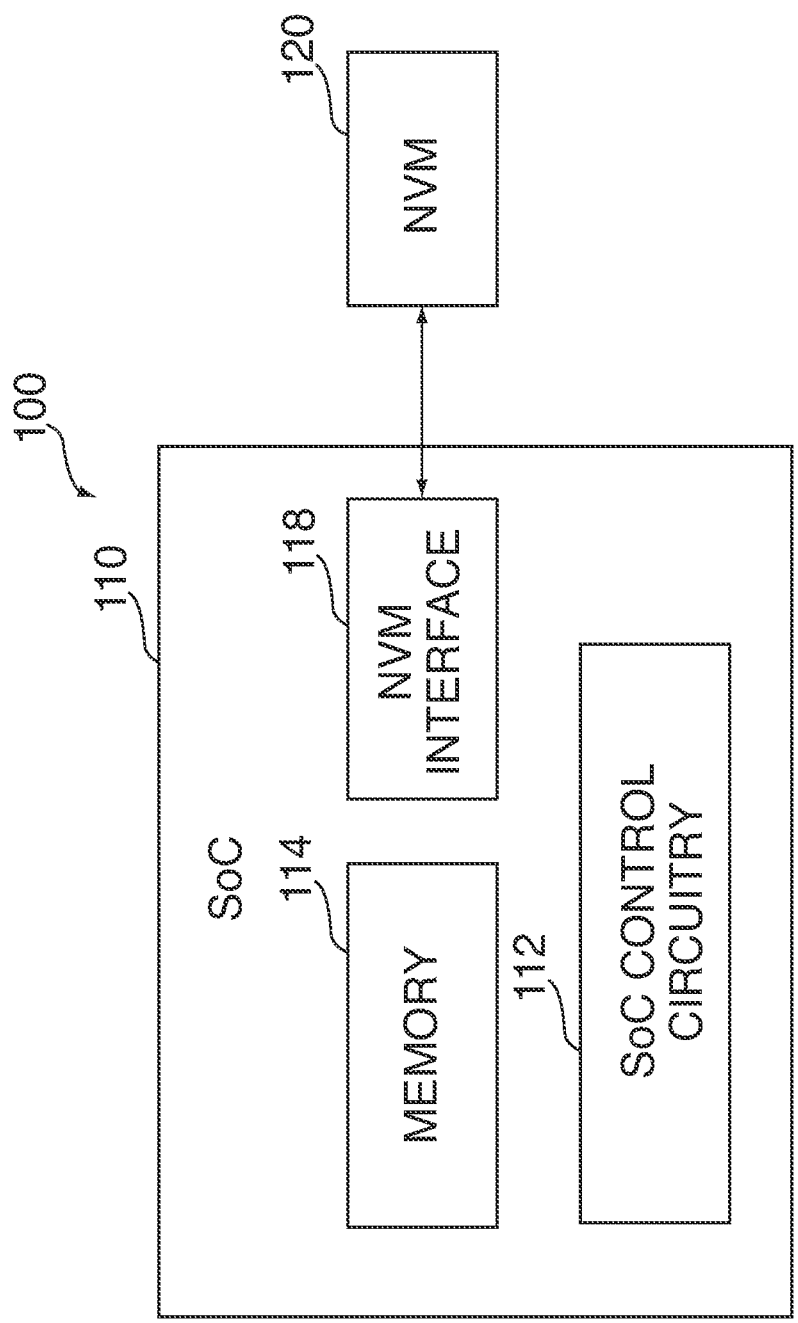
FIGS. 1 and 2 are schematic views of electronic devices configured in accordance with various embodiments of the invention.

FIG. 1 is a schematic view of electronic device 100. In some embodiments, electronic device 100 can be or can include a portable media player (e.g., an iPod™ made available by Apple Inc. of Cupertino, Calif.), a cellular telephone (e.g., an iPhone™ made available by Apple Inc.), a pocket-sized personal computer, a personal digital assistance ("PDA"), a desktop computer, a laptop computer, and any other suitable type of electronic device.

Electronic device 100 can include system-on-a-chip ("SoC") 110 and non-volatile memory ("NVM") 120. Non-volatile memory 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), any other known or future types of non-volatile memory technology, or any combination thereof.

NVM 120 can be organized into "blocks", which is the smallest erasable unit, and further organized into "pages", which can be the smallest unit that can be programmed or read. In some embodiments, NVM 120 can include multiple integrated circuits, where each integrated circuit may have multiple blocks. The blocks from corresponding integrated circuits (e.g., blocks having the same position or block number) may form "super blocks." Each memory location (e.g., page or block) of NVM 120 can be addressed using a physical address (e.g., a physical page address or physical block address).

FIG. 1, as well as later figures and various disclosed embodiments, may sometimes be described in terms of using flash technology. However, this is not intended to be limiting, and any other type of non-volatile memory can be implemented instead. Electronic device 100 can include other components, such as a power supply or any user input or output components, which are not depicted in FIG. 1 to prevent overcomplicating the figure.

SoC 110 can include SoC control circuitry 112, memory 114, and NVM interface 118. SoC control circuitry 112 can control the general operations and functions of SoC 110 and the other components of SoC 110 or device 100. For example, responsive to user inputs and/or the instructions of an application or operating system, SoC control circuitry 112 can issue read or write commands to NVM interface 118 to obtain data from or store data in NVM 120. For clarity, data that SoC control circuitry 112 may request for storage or retrieval may be referred to as "user data," even though the data may not be directly associated with a user or user application. Rather, the user data can be any suitable sequence of digital information generated or obtained by SoC control circuitry 112 (e.g., via an application or operating system).

SoC control circuitry 112 can include any combination of hardware, software, and firmware, and any components, circuitry, or logic operative to drive the functionality of electronic device 100. For example, SoC control circuitry 112 can include one or more processors that operate under the control of software/firmware stored in NVM 120 or memory 114.

Memory 114 can include any suitable type of volatile or non-volatile memory, such as dynamic random access memory ("DRAM"), synchronous dynamic random access memory ("SDRAM"), double-data-rate ("DDR") RAM, cache memory, read-only memory ("ROM"), or any combination thereof. Memory 114 can include a data source that can temporarily store user data for programming into or reading from non-volatile memory 120. In some embodiments, memory 114 may act as the main memory for any processors implemented as part of SoC control circuitry 112.

NVM interface 118 may include any suitable combination of hardware, software, and/or firmware configured to act as an interface or driver between SoC control circuitry 112 and NVM 120. For any software modules included in NVM interface 118, corresponding program code may be stored in NVM 120 or memory 114.

NVM interface 118 can perform a variety of functions that allow SoC control circuitry 112 to access NVM 120 and to manage the memory locations (e.g., pages, blocks, super blocks, integrated circuits) of NVM 120 and the data stored therein (e.g., user data). For example, NVM interface 118 can interpret the read or write commands from SoC control circuitry 112, perform wear leveling, and generate read and program instructions compatible with the bus protocol of NVM 120.

While NVM interface 118 and SoC control circuitry 112 are shown as separate modules, this is intended only to simplify the description of the embodiments of the invention. It should be understood that these modules may share hardware components, software components, or both. For example, a processor implemented as part of SoC control circuitry 112 may execute a software-based memory driver for NVM interface 118. Accordingly, portions of SoC control circuitry 112 and NVM interface 118 may sometimes be referred to collectively as "control circuitry."

FIG. 1 illustrates an electronic device where NVM 120 may not have its own controller. In other embodiments, electronic device 100 can include a target device, such as a flash or SD card, that includes NVM 120 and some or all portions of NVM interface 118 (e.g., a translation layer, discussed below). In these embodiments, SoC 110 or SoC control circuitry 112 may act as the host controller for the target device. For example, as the host controller, SoC 110 can issue read and write commands to the target device.

Figure 2:
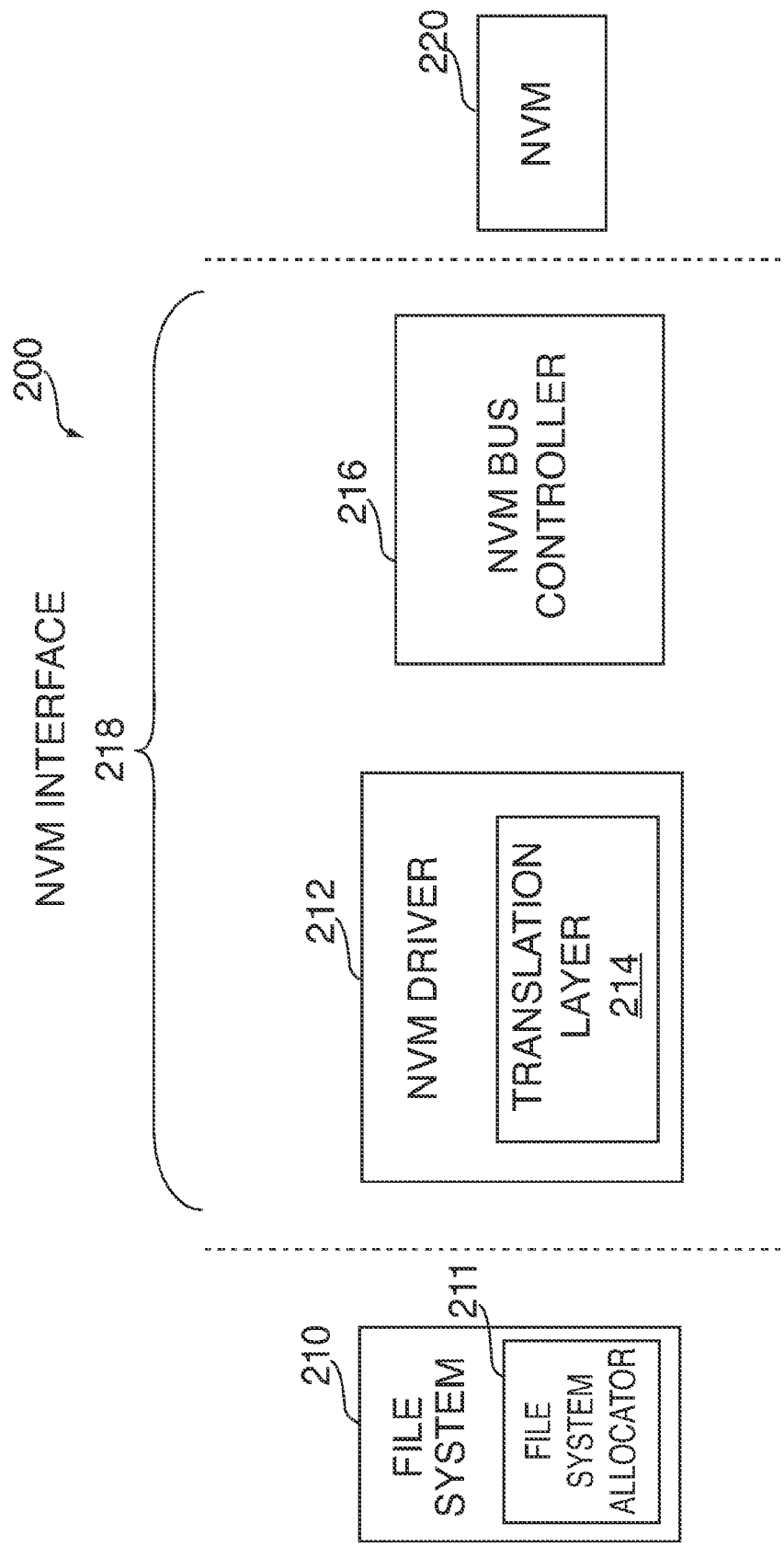

FIG. 2 is a schematic view of electronic device 200, which may illustrate in greater detail some of the firmware, software and/or hardware components of electronic device 100 (FIG. 1) in accordance with various embodiments. Electronic device 200 may have any of the features and functionalities described above in connection with FIG. 1, and vice versa. Electronic device 200 can include file system 210, NVM driver 212, NVM bus controller 216, and NVM 220. In some embodiments, file system 210 and NVM driver 212 may be software or firmware modules, and NVM bus controller 216 and NVM 220 may be hardware modules. Accordingly, in these embodiments, NVM driver 212 may represent the software or firmware aspect of NVM interface 218, and NVM bus controller 216 may represent the hardware aspect of NVM interface 218.

File system 210 can include any suitable type of file system and may be part of the operating system of electronic device 200 (e.g., part of SoC control circuitry 112 of FIG. 1). In some embodiments, file system 210 may include a flash file system, which provides a logical to physical mapping of pages. File system 210 may perform some or all of the functionalities of NVM driver 212 discussed below, and therefore file system 210 and NVM driver 212 may or may not be separate modules.

File system 210 may manage file and folder structures for the application and operating system. File system 210 may operate under the control of an application or operating system running on electronic device 200, and may provide write and read commands to NVM driver 212 when the application or operating system requests that information be read from or stored in NVM 220.

In some embodiments, file system 210 can include file system allocator 211, which can allocate memory regions to one or more files generated by an application or operating system. For example, in response to receiving a request from an application or operating system to store data associated with a file in NVM 220, file system allocator 211 can select a memory region in a logical space that can be used to store the data associated with the file. Thus, along with each read or write command, file system 210 can provide a logical address corresponding to the selected memory region to NVM interface 218 indicating where the user data should be read from or written to, such as a logical page address or a logical block address ("LBA"). File system allocator 211 will be described in more detail in connection with FIGS. 3-6.

File system 210 may provide read and write requests to NVM driver 212 that are not directly compatible with NVM 220. For example, the logical addresses may use conventions or protocols typical of hard-drive-based systems. A hard-drive-based system, unlike flash memory, can overwrite a memory location without first performing a block erase. Moreover, hard drives may not need wear leveling to increase the lifespan of the device. Therefore, NVM interface 218 can perform any functions that are memory-specific, vendor-specific, or both to handle file system requests and perform other management functions in a manner suitable for NVM 220.

NVM driver 212 can include translation layer 214. In some embodiments, translation layer 214 may be or include a flash translation layer ("FTL"). On a write operation, translation layer 214 can map the provided logical address to a free, erased physical location on NVM 220. On a read operation, translation layer 214 can use the provided logical address to determine the physical address at which the requested data is stored. Because each NVM may have a different layout depending on the size or vendor of the NVM, this mapping operation may be memory and/or vendor specific. Translation layer 214 can perform any other suitable functions in addition to logical-to-physical address mapping. For example, translation layer 214 can perform any of the other functions that may be typical of flash translation layers, such as garbage collection and wear leveling.

NVM driver 212 may interface with NVM bus controller 216 to complete NVM access requests (e.g., program, read, and erase requests). Bus controller 216 may act as the hardware interface to NVM 220, and can communicate with NVM 220 using the bus protocol, data rate, and other specifications of NVM 220.

NVM interface 218 may manage NVM 220 based on memory management data, sometimes referred to herein as "metadata." The metadata may be generated by NVM driver 212 or may be generated by a module operating under the control of NVM driver 212. For example, metadata can include any information used for managing the mapping between logical and physical addresses, bad block management, wear leveling, error correcting code ("ECC") data, or any combination thereof. The metadata may include data provided by file system 210 along with the user data, such as a logical address. Thus, in general, "metadata" may refer to any information about or relating to user data or used generally to manage the operation and memory locations of a non-volatile memory.

NVM interface 218 may be configured to store metadata in NVM 220. In some embodiments, NVM interface 218 may store metadata associated with user data at the same memory location (e.g., page) in which the user data is stored. For example, NVM interface 218 may store user data, the associated logical address, and ECC data for the user data at one or more memory locations of NVM 220. NVM interface 218 may also store other types of metadata about the user data in the same memory location. For example, the metadata may contain a flag that indicates whether the stored data is good data.

NVM interface 218 may store the logical address so that, on power-up of NVM 220 or during operation of NVM 220, electronic device 200 can determine what data resides at that location. In particular, because file system 210 may reference the user data according to its logical address and not its physical address, NVM interface 218 may store the user data and logical address together to maintain their association. For example, in embodiments where NVM interface 218 maps logical sectors directly to physical pages, NVM interface 218 may store logical-to-physical mappings in pages in the NVM.

When a file system (e.g., file system 210 of FIG. 2) receives a request to store data (e.g., user data) associated with a file in memory (e.g., NVM 120 of FIG. 1, NVM 220 of FIG. 2, or a hard drive), a file system allocator (e.g., file system allocator 211 of FIG. 2) may allocate a memory region to the file. For example, for systems that are tuned to hard drive access patterns, the file system allocator may allocate the largest free memory region that is also contiguous.

Figure 3:
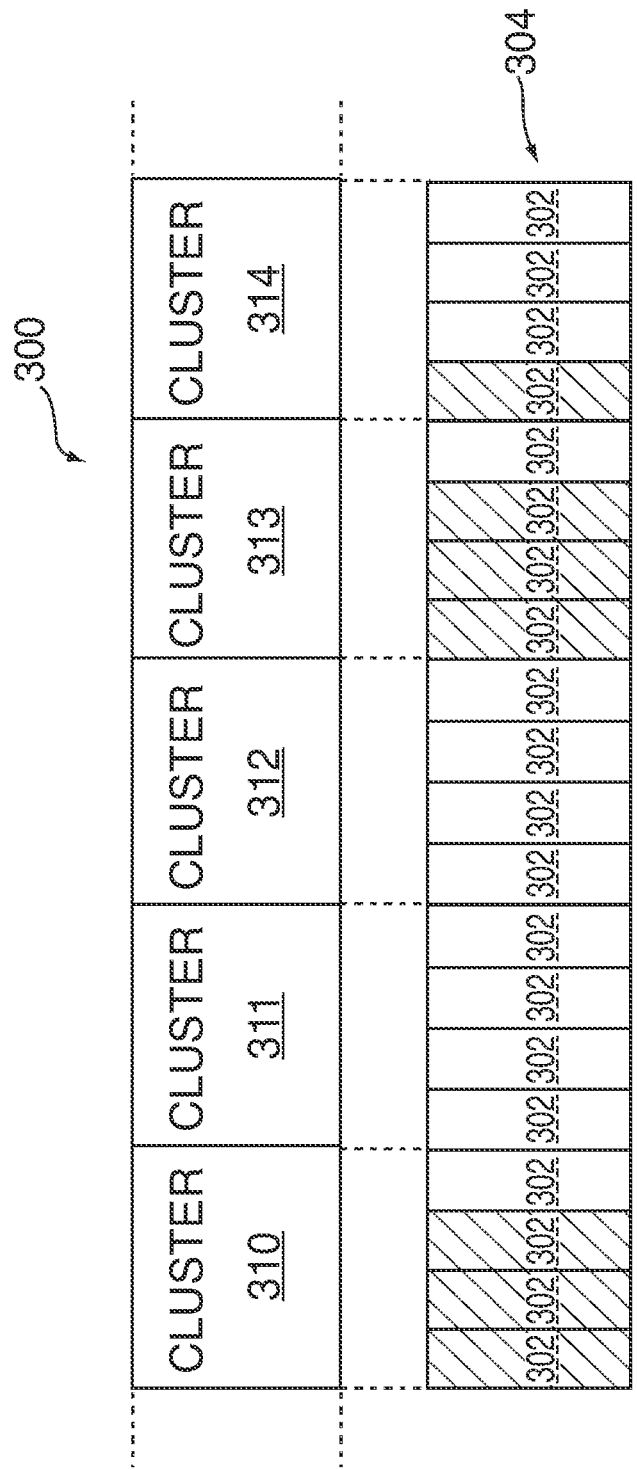
FIG. 3 is an illustrative graphical view of a mapping between clusters of a file system and memory regions of a memory in accordance with various embodiments of the invention.

FIG. 3 shows a graphical view of a mapping 300 between clusters 310-314 and sectors 302. Sectors 302 can be included in any suitable type of memory 304 such as, for example, a hard drive or a NVM (e.g., NVM 120 of FIG. 1 or NVM 220 of FIG. 2).

A sector can be the smallest granular unit that can be read from and/or written to, and can have any suitable size such as, for example, 4K or 8K. The shaded boxes in memory 304 can represent the allocated sectors, and the unshaded boxes can represent the free sectors.

A file system (e.g., file system 210 of FIG. 2) can group one or more sectors 302 (e.g., from 4 to 64 sectors) of memory 304 into a cluster. A cluster can therefore be the smallest memory region of memory 304 that the file system allocator can allocate to a file. For example, if each cluster has a size of 16K, the file system allocator will need to allocate one cluster for any file with a size that is 16K or less, and two clusters for any file with a size that is between 16K and 32K.

As shown in FIG. 3, for example, each cluster of clusters 310-314 can correspond to four sectors of memory 304. Accordingly, clusters 310, 313, and 314 may correspond to clusters that have already been allocated to one or more files, while clusters 311 and 312 may correspond to clusters that are free of data and thus available to be allocated.

In some embodiments, in response to receiving a request to store data associated with a file, the file system allocator can attempt to find and allocate a portion of the largest contiguous string of free space in memory 304 (e.g., largest string of free clusters). In the example shown in FIG. 3, the file system allocator can begin by allocating cluster 311 to a file. After cluster 311 has been allocated and additional space is still needed, the file system allocator can allocate cluster 312. Thus, if clusters 311 and 312 are both allocated to the same file, the file system allocator can string clusters 311 and 312 together and associate these clusters with the file. The file system can subsequently use this association to read data from the file.

Accordingly, the allocation policy in these embodiments can be efficient in a hard-drive-based system because large efficiency overheads are associated with seeking non-sequential locations on a hard drive. In particular, by limiting writes to large contiguous regions and avoiding fragmented regions on the hard drive, writes can be performed more efficiently because writes are made to sequential locations on the hard drive.

However, in a system having a NVM, the write efficiency of the system can generally be improved if a file system allocator can allocate memory regions while maintaining an awareness of the memory organization of the NVM. This is because the efficiency of writes may depend on the number of memory regions (e.g., logical blocks) that must be written in response to a write request. As used herein, a "logical block" can represent a particular range of sectors and their associated logical addresses (e.g., logical page addresses or LBAs). In particular, sectors and their associated logical addresses may be used by a file system (e.g., file system 210 of FIG. 2) to communicate with a NVM (e.g., NVM 120 of FIG. 1 or NVM 220 of FIG. 2).

Figure 4:
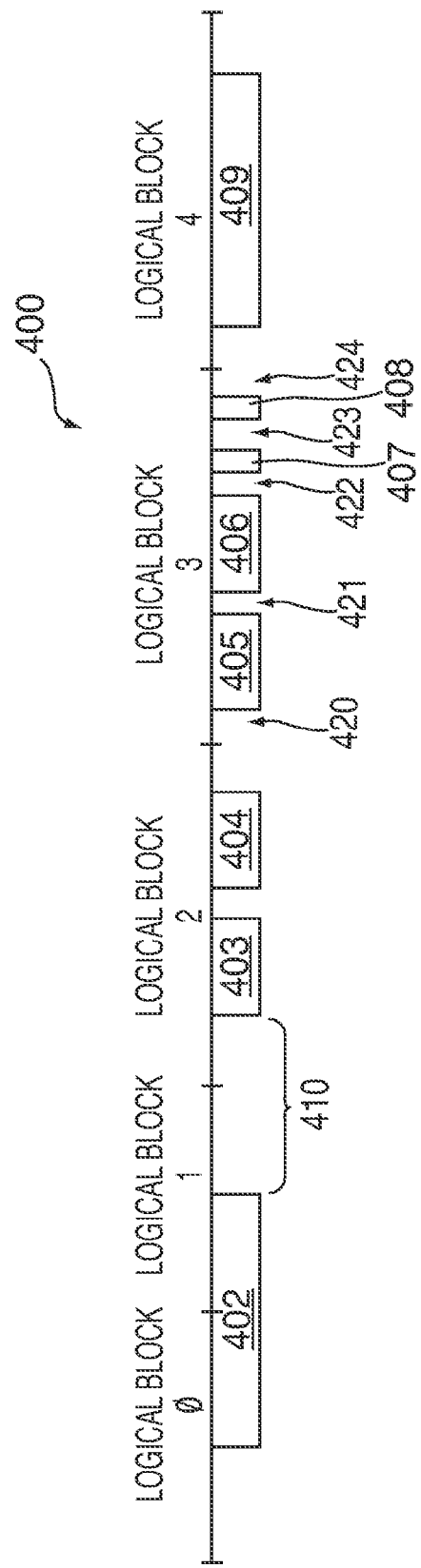
FIG. 4 is an illustrative graphical view of a portion of a logical space in accordance with various embodiments of the invention.

Referring now to FIG. 4, an illustrative graphical view of a portion of logical space 400 is shown. The logical addresses of the sectors in logical space 400 may be used by a file system (e.g., file system 210 of FIG. 2) to reference data stored in one or more memory locations on a NVM (e.g., NVM 120 of FIG. 1 or NVM 220 of FIG. 2). Persons skilled in the art will appreciate that each LBA can be associated with one, two, three, or more sectors. Persons skilled in the art will also appreciate that each sector can have any suitable size such as, for example, 4K or 8K.

As shown in FIG. 4, logical space 400 can include one or more allocated sectors 402-409, which may have already been allocated (e.g., pre-allocated) by a file system (e.g., file system 210 of FIG. 2) to one or more files stored on the NVM. The remaining sectors located between allocated sectors 402-409 can be one or more free sectors of logical space 400 that are available for the file system to allocate to new files. For example, the file system can allocate these free sectors to one or more new files generated by a video application (e.g., files for storing newly recorded video files).

The sectors of logical space 400 and their associated LBAs can be grouped into logical blocks 0-4. Persons skilled in the art will appreciate that although logical space 400 is shown to have four logical blocks, logical space 400 can include any suitable number of logical blocks.

Logical blocks 0-4 can correspond to various super block-aligned regions in the NVM (e.g., one or more physical blocks of the NVM), where each region can correspond to the range of LBAs that are associated with a respective logical block. In some embodiments, each logical block in logical blocks 0-4 can have a constant size, which can be the same as the size of the corresponding super block(s). For example, each logical block can have a size of 2, 4, or 8 MB, depending on the size of the corresponding super block. In other embodiments, each logical block can have a variable size. For example, logical blocks 0-4 can have a variable size if the NVM has a mixture of single-level-cell blocks (e.g., where each memory cell of the blocks stores one bit of data) and multi-level-cell blocks (e.g., where each memory cell of the blocks stores multiple bits of data).

Persons skilled in the art will appreciate that each page of a physical block can map to one or more sectors of a logical block (e.g., two sectors), and correspondingly each page of the block can map to the LBAs that are associated with the one or more sectors. For the sake of simplicity, however, the following discussion assumes that each sector of a logical block maps to a single page of a block.

In one embodiment, each logical block can correspond to a block referred to as a "data block", which can provide for long-term storage of data. In addition, some logical blocks can also correspond to an additional block of the NVM, referred to as a "log block". A log block can store new data associated with a logical block.

If a file system allocator (e.g., file system allocator 211 of FIG. 2) does not have any knowledge of logical blocks (or super block boundaries), as in a system tuned to hard drive access patterns, the file system allocator may attempt to find and allocate the largest contiguous string of free space to a new file. For example, the file system allocator may determine that memory region 410 is the largest contiguous free space in logical space 400, and can consequently allocate memory region 410 to the new file.

However, because memory region 410 spans across two different logical blocks in logical space 400 (e.g., logical blocks 1 and 2), writes performed on memory region 410 can be inefficient. In particular, after new data has been written to a logical block, at least one merge operation needs to be performed in order to combine the new data with the stored data. This merge operation can involve multiple copy and erase operations of the physical blocks (e.g., data and log blocks) associated with the logical block. These operations can decrease system efficiency and increase memory wear. For example, because two logical blocks are associated with memory region 410, both logical blocks 1 and 2 will need to be merged if the free space in logical block 1 is not sufficient to store all of the data.

On the other hand, if the file system allocator is instead configured to be aware of logical block boundaries, the file system allocator can allocate memory regions to a file that is aligned with one or more logical blocks. That is, the allocated memory regions can be one or more super block-aligned regions. Accordingly, in a system where the writes are generated by an application stored on the electronic device itself, the file system allocator can be modified such that the allocator can allocate memory regions aligned with one or more logical blocks. For instance, in the example shown in FIG. 4, the file system allocator can be configured such that the allocator can allocate one or more of the free sectors of logical block 3 (e.g., free sectors in regions 420-424 of logical block 3) to a new file.

In addition, the file system allocator can be configured to allocate the free sectors of a logical block in a sequential order. That is, the file system allocator can allocate the free sectors in a forward sequential order based on the logical address of each free sector. In the example shown in FIG. 3, for instance, the file system allocator can allocate the free sectors of logical block 3 in an order such that the free sectors in region 420 are allocated first, the free sectors in regions 421 are allocated second, the free sectors in region 422 are allocated third, etc.

FIG. 5 shows a more detailed view of memory regions in logical space 500. Logical space 500 can include one or more logical blocks 502-508, and each logical block may be associated with one or more blocks (e.g., a data block and a log block) of a NVM (e.g., NVM 120 of FIG. 1 or NVM 220 of FIG. 2). Each logical block can include one or more allocated and/or free sectors. For example, the shaded boxes in logical blocks 502-508 can represent the allocated sectors, and the unshaded boxes can represent the free sectors.

Persons skilled in the art will appreciate that any suitable number of sectors can be included in a logical block. For the sake of simplicity, however, logical blocks 502-508 are shown to have ten sectors each.

In a system that is tuned to hard drive access patterns, a file system allocator may select to allocate the largest contiguous memory region in logical space 500 (e.g., memory region 520). Unfortunately, such a memory region may also span across multiple logical blocks (e.g., logical blocks 502 and 504). As discussed previously, each of these logical blocks will need to be merged once a write operation has been performed on the logical block.

However, if a file system allocator (e.g., file system allocator 211 of FIG. 2) is instead configured to allocate sectors along logical block boundaries, the allocator can find the most efficient memory region in a NVM to allocate to a file.

In such a configuration, the file system allocator may need to begin by monitoring one or more characteristics of logical space 500. In some embodiments, the file system allocator can determine that a NVM has logical blocks that are constant in size. Responsive to this determination, the file system allocator can monitor the number of free sectors corresponding to each logical block in logical space 500 (e.g., logical blocks 502-508). For example, the file system allocator can maintain an array of the number of free sectors corresponding to each logical block (e.g., an array of 32-bit integers), where each element of the array can correspond to the number of free sectors of a logical block. For instance, the array can be represented by:

int free_sectors[num_logical_blocks], where num_logical blocks represents the number of elements of the free_sectors array and can correspond to the number of logical blocks in logical space 500. Thus, given a particular logical block, the file system allocator can use the free_sectors array to determine the number of free sectors corresponding to the logical block.

When the file system is first mounted to the NVM, the file system allocator can populate the elements of the free_sectors array. For example, using a free space mapping structure (e.g., a block bitmap or a file allocation table ("FAT")), the file system allocator can determine the number of free sectors corresponding to each logical block. For instance, the file system allocator can determine the number of free sectors based on one or more associated block bitmaps or FAT entries. Then, for each logical block, the file system allocator can update the corresponding element in the free_sectors array with the number of free sectors. Table 1 shows an example of the free_sectors array corresponding to logical blocks 502-508 of logical space 500.

TABLE 1

| logical block | free_sectors[logical block] |
|---|---|
| 502 | 2 |
| 504 | 3 |
| 506 | 4 |
| 508 | 1 |

In other embodiments, the file system allocator can determine that a NVM has logical blocks that are variable in size. Responsive to this determination, the file system allocator can monitor a ratio of free space to total space corresponding to each logical block in logical space 500. For example, the file system allocator can maintain an array of the ratio of free space to total space corresponding to each logical block, which can be represented by:

float ratio_space[num_logical_blocks].

Table 2 shows an example of the ratio_space array corresponding to logical blocks 502-508 of logical space 500.

TABLE 2

| logical block | ratio_space[logical block] |
|---|---|
| 502 | 0.2 |
| 504 | 0.3 |
| 506 | 0.4 |
| 508 | 0.1 |

Persons skilled in the art will appreciate that these are merely illustrative examples, and that the file system allocator can monitor any suitable characteristic of logical space 500. For example, instead of or in addition to the free_sectors array and the ratio_space array, the file system allocator can monitor a ratio of free space to allocated space corresponding to each logical block in logical space 500.

During the operation of a device (e.g., electronic device 100 of FIG. 1 or electronic device 200 of FIG. 2), the file system allocator can continuously update the free_sectors array and/or the ratio_space array. For example, in response to detecting that a file has been deleted, the file system allocator can increase the one or more corresponding elements in the free_sectors array by the number of sectors previously associated with the file. As another example, the file system allocator can increase the one or more corresponding elements in the ratio_space array by the ratio of sectors previously associated with the file.

At a later point in time, the file system allocator may receive a request to store data associated with a file in the NVM. Responsive to this request, the file system allocator can select a logical block for allocation (e.g., logical block 506) based at least in part on the number of free sectors associated with the logical block (e.g., based on the number of free sectors corresponding to each logical block and/or the ratio of free space to total space).

For example, if the file system allocator determines that the system has logical blocks that are constant in size, the file system allocator can select a logical block that has the largest number of free sectors (e.g., the largest element in the free_sectors array). As another example, if the file system allocator determines that the system has logical blocks that are variable in size, the file system allocator can select a logical block that has the largest ratio of free space to total space (e.g., the largest element in the ratio_space array). In one embodiment, if an array (e.g., the free_sectors array and/or the ratio_space array) is a priority queue, the file system allocator can find the largest value in the queue. Persons skilled in the art will appreciate that a priority queue is one computationally efficient approach to finding the largest value in a queue. Accordingly, the file system allocator can use any suitable data structure to find the largest value in a queue.

After selecting a logical block, the file system allocator can sequentially allocate at least a portion of the free sectors of the selected logical block to a file. In the example shown in FIG. 5, the file system allocator can allocate free sectors 510-513 in a forward sequential order based on the logical address of each free sector. For instance, sector 510 of logical block 506 can be allocated and written first, sector 511 can be allocated and written second, sector 512 can be allocated and written third, etc.

In some embodiments, after each free sector of logical block 506 has been allocated, the file system allocator can update the corresponding element in an array (e.g., the free_sectors array and/or the ratio_space array) based on the number of remaining free sectors. For example, the file system allocator can decrease the corresponding element in the free_sectors array by one. For instance, after detecting that free sector 510 has been allocated, free_sectors[logical_ block 506] can be updated from a value of 4 to a value of 3.

In other embodiments, the file system allocator can update the corresponding element in an array (e.g., the free_sectors array and/or the ratio_space array) once the file system allocator has reached the end of logical block 506 or has reached the end of the allocated free sectors of logical block 506. For example, after detecting the end of logical block 506 or determining that free sectors 510-513 of logical block 506 have all been allocated, the file system allocator can determine the number of remaining free sectors corresponding to logical block 506 (e.g., by searching the free space mapping structure). The file system allocator can then update the corresponding element in the free_sectors array (e.g., free_sectors [logical_block 506]) based on the number of remaining free sectors.

After allocating one or more free sectors, the file system allocator may determine that additional free sectors are needed by a file system. The file system allocator can then make a decision of whether to allocate free sectors from a new logical block or continue to allocate from the current logical block.

The file system allocator can determine whether a new logical block is needed using any suitable approach. In some embodiments, while a logical block is being allocated, the file system allocator can monitor an allocation point within the logical block. In particular, after each free sector of the logical block is allocated, the allocation point can be incremented by one. Consequently, the file system allocator can determine that a new logical block needs to be allocated when the allocation point reaches a pre-determined value (e.g., reaches the number of free sectors in a logical block). For example, after the last allocated free sector in logical block 506 (e.g., sector 513) has been allocated, the allocation point can have a value of 4, which is the same as the number of free sectors in logical block 506.

In other embodiments, the file system allocator can determine that a new logical block is needed based on detecting an end of the logical block. In further embodiments, the file system allocator can determine that a new logical block is needed based on detecting that there are no more free space in the logical block. For example, after reaching the last allocated free sector of a logical block, the file system allocator can determine whether there are any other free sectors in the logical block. For instance, the file system can search for additional free sectors by searching the free space mapping structure (e.g., a block bitmap or a FAT). In particular, the file system may locate additional free sectors if one or more previously allocated sectors in the logical block have been erased since the initial allocation.

In some embodiments, in response to determining that a new logical block is needed, the file system allocator can select a new logical block based at least in part on the number of free sectors associated with the new logical block (e.g., a new logical block with the largest number of free sectors or the largest ratio of free space to total space). As discussed previously, the file system allocator can locate the new logical block by searching an array (e.g., the free_sectors array and/or the ratio_space array). In the example shown in FIG. 5, the file system allocator can select new logical block 504. After selecting new logical block 504, the file system allocator can allocate at least a portion of free sectors 514-516 in a sequential order.

The pseudo-code for such an allocation policy can be represented by:

```
int CurrentLogicalBlock;
if (needNewLogicalBlock){
    findMaxFreeLogicalBlock
        (CurrentLogicalBlock);
}
AllocateNextSector( );
``` where CurrentLogicalBlock can be a variable with a long-term scope (e.g., a global variable) and can represent the logical block that is currently being allocated. Thus, if a new logical block is needed (e.g., (need NewLogicalBlock) is true), the function findMaxFreeLogicalBlock can be used to find a new logical block in the logical space, where the new logical block can be set as the CurrentLogicalBlock. If, however, a new logical block is not need (e.g., (needNewLogicalBlock) is false), the function AllocateNextSector can be used to find the next sequential free sector in the current logical block.

Accordingly, because the efficiency of a system having a NVM is dependent on the number of memory operations that needs to be performed on the NVM, the long-term efficiency of the system can be improved by limiting the allocation of free sectors to one logical block at a time. Moreover, although the number of free sectors in logical block 506 is less than the total number of sectors in memory region 520, which may be the region selected for a hard-drive-based system, logical block 506 is still the more efficient region to allocate for a system having a NVM. This is because the system only needs to merge one logical block if only four sectors are needed for a write request, whereas the system will have to merge two logical blocks in memory region 520 if the same number of sectors is needed.

In some embodiments, the file system allocator can further be configured to allocate super block-aligned memory regions regardless of how the free sectors are distributed in a memory region. For example, FIG. 6 shows a detailed view of memory regions in logical space 600.

In response to receiving a request to store data associated with a file in the NVM, a file system allocator (e.g., file system allocator 211 of FIG. 2) can determine that logical block 604 has the most free space. Because sectors 610-614 are all located in one logical block, the file system allocator can still sequentially allocate free sectors 610-614 to the file despite the fragmentation of data in logical block 604.

This allocation policy is undesirable for a hard-drive-based-system because sectors 610-614 are distributed at non-contiguous locations. In particular, the hard-drive-based-system must perform multiple seeks on the hard drive in order to find these free memory locations.

In contrast, this allocation policy is efficient for a system having a NVM. Although the immediate write performance for such a system may be slightly decreased as compared to a conventional system (e.g., the size of average writes may be smaller as compared to the size of writes in a conventional system), the system will still be performing fewer merge operations, and over time such an allocation policy becomes more efficient. Moreover, if the system is able to simultaneously execute multiple write requests on an input/output ("I/O") queue, the system may be able to compensate for any data fragmentation created by such an allocation policy.

Figure 7:
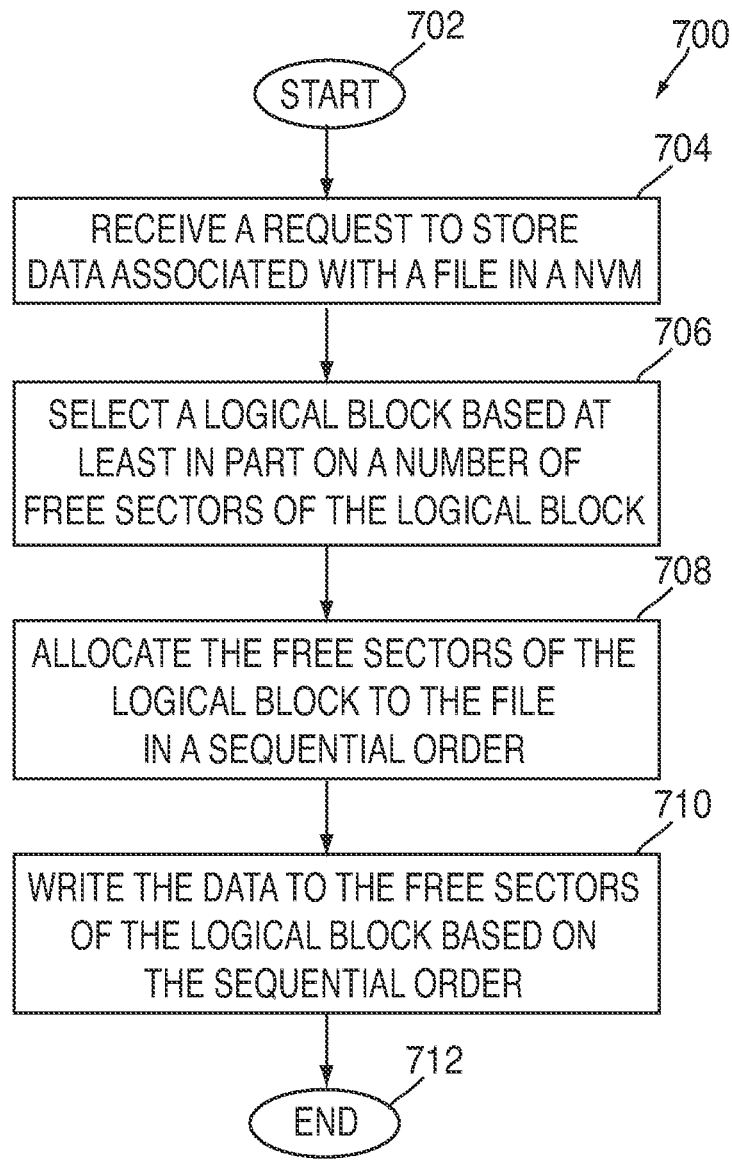
FIG. 7 is a flowchart of an illustrative process for allocating sectors of a logical block to a file in accordance with various embodiments of the invention.
Figure 8:
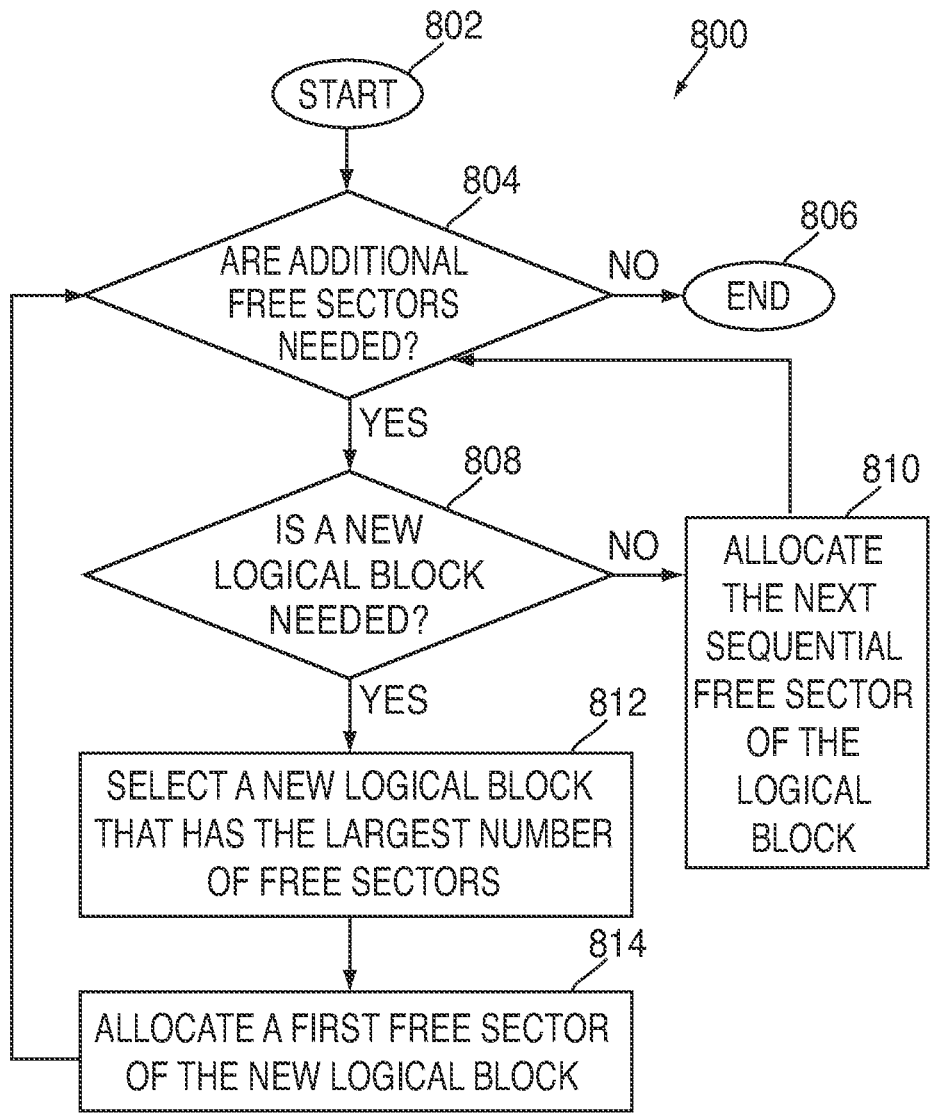
FIG. 8 is a flowchart of an illustrative process for allocating data associated with a file to one or more sectors of a logical space in accordance with various embodiments of the invention.

Referring now to FIGS. 7 and 8, flowcharts of illustrative processes 700 and 800 are shown for allocating memory regions in a NVM (e.g., NVM 120 of FIG. 1 or NVM 220 of FIG. 2). The steps of these processes may be executed by any suitable component(s) of a SoC (e.g., SoC 110 of FIG. 1) for an electronic device or system, such as by a file system allocator (e.g., file system allocator 211 of FIG. 2).

Turning first to FIG. 7, a flowchart of an illustrative process 700 is shown for allocating sectors of a logical block to a file according to an embodiment of the invention. Process 700 may begin at step 702. At step 704, a file system allocator may receive a request to store data associated with a file in a NVM.

At step 706, the file system allocator can select a logical block (e.g., logical block 506 of FIG. 5 or logical block 604 of FIG. 6) based at least in part on a number of free sectors of the logical block. For example, based on a free_sectors array, the file system allocator can select a logical block with the largest number of free sectors. As another example, based on a ratio_space array, the file system allocator can select a logical block with the largest ratio of free space to total space.

Continuing to step 708, the file system allocator can allocate the free sectors (e.g., free sectors 510-513 of FIG. 5 or sectors 610-614 of FIG. 6) of the logical block to the file in a sequential order. For example, the file system allocator can allocate the free sectors in a forward sequential order based on the logical address of each free sector.

Then, at step 710, an NVM interface (e.g., NVM interface 118 of FIG. 1 or NVM interface 218 of FIG. 2) can write the data to the free sectors of the logical block based on the sequential order. Process 700 may then end at step 712.

FIG. 8 is a flowchart of an illustrative process 800 for allocating data associated with a file to one or more sectors of a logical space (e.g., logical space 500 of FIG. 5 or logical space 600 of FIG. 6) according to an embodiment of the invention. In some embodiments, process 800 may be a more detailed view of allocation step 708 of process 700 of FIG. 7.

Process 800 may begin at step 802, where the file system allocator may have already allocated a free sector (e.g., free sector 510 of FIG. 5 or free sector 610 of FIG. 6) of a logical block (e.g., logical block 506 of FIG. 5 or logical block 604 of FIG. 6) to a file. A NVM interface (e.g., NVM interface 118 of FIG. 1 or NVM interface 218 of FIG. 2) may then write data associated with the file to the allocated sector.

At step 804, the file system allocator can determine if additional free sectors are needed. If, at step 804, the file system allocator determines that additional free sectors are not needed, process 800 may end at step 806.

If, at step 804, the file system allocator instead determines that additional free sectors are needed, process 800 may move to step 808. At step 808, the file system allocator can determine if a new logical block is needed. For example, the file system allocator can determine that a new logical block is needed based on determining that an allocation point has reached a pre-determined value (e.g., the number of free sectors in the logical block). As another example, the file system allocator can determine that a new logical block is needed based on detecting an end of the logical block. As yet another example, the file system allocator can determine that a new logical block is needed based on detecting that there are no more free space in the logical block (e.g., by searching a free space mapping structure).

If, at step 808, the file system allocator determines that a new logical block is not needed, process 800 may move to step 810. The file system allocator may make this determination based on, for example, determining that an allocation point has not reached the pre-determined value, failing to detect an end of the logical block, and/or detecting that there is additional free space in the logical block.

At step 810, the file system allocator can allocate the next sequential free sector of the logical block. Process 800 can then return to step 804, where the file system allocator can determine if additional free sectors are needed.

If, at step 808, the file system allocator instead determines that a new logical block is needed, process 800 may move to step 812. At step 812, the file system allocator can select a new logical block that has the largest number of free sectors. For example, for logical space 500 (FIG. 5), the file system allocator can select logical block 504 as the new logical block. As another example, for logical space 600 (FIG. 6), the file system allocator can select logical block 602 as the new logical block.

Continuing to step 814, the file system allocator can allocate a first free sector of the new logical block. For example, the file system allocator can allocate free sector 514 of logical block 504 (FIG. 5). As another example, the file system allocator can allocate sector 615 of logical block 602 (FIG. 6).

Process 800 may then return to step 804, where the file system allocator can determine if additional free sectors are needed.

It should be understood that the steps of processes 700 and 800 are merely illustrative. Any of the steps may be removed, modified, or combined, and any additional steps may be added, without departing from the scope of the invention.

The described embodiments of the invention are presented for the purpose of illustration and not of limitation.

What is claimed is:

1. A method for optimal memory allocations in a logical space corresponding to a non-volatile memory ("NVM"), the method comprising:
receiving a request to store data associated with a file in the NVM, the NVM comprising at least two dies comprising a plurality of physical blocks, wherein each of a plurality of super blocks comprises a physical block located in each of the at least two dies, and wherein each superblock comprises super block boundaries;
selecting a logical block of the logical space with a largest number of free sectors, wherein the logical block comprises boundaries that are aligned with the super block boundaries of one of the super blocks, and wherein the free sectors within the selected logical block are randomly distributed at non-contiguous physical locations;
allocating the free sectors of the logical block in a sequential order to the file; and
writing the data to the free sectors based on the sequential order so that a write access pattern is optimized for the selected block even though the sectors are randomly distributed within the super block.

2. The method of claim 1, wherein the selecting the logical block further comprises monitoring a number of free sectors corresponding to each logical block in the logical space.

3. The method of claim 1, wherein the NVM comprises a NAND flash memory.

4. The method of claim 1, wherein the free sectors are non-contiguous.

5. The method of claim 1, wherein the free sectors are selected from contiguous and non-contiguous sectors within the logical block.

6. The method of claim 1, wherein the writing the data further comprises writing the data to a first free sector of the logical block.

7. The method of claim 6, wherein the writing the data further comprises:
determining whether a new logical block is needed; and
in response to determining that a new logical block is needed, selecting a logical block with a largest number of free sectors as the new logical block.

8. The method of claim 7, wherein the determining whether a new logical block is needed comprises monitoring an allocation point within the logical block.

9. The method of claim 7, wherein in response to determining that a new logical block is not needed, continuing to write the data to a next sequential free sector of the logical block.

10. A system comprising:
a non-volatile memory ("NVM") comprising at least two dies comprising a plurality of physical blocks comprising a plurality of physical blocks, wherein each of a plurality of super blocks comprises a physical block located in each of the at least two dies, and wherein each superblock comprises super block boundaries; and
a file system allocator for allocating free sectors contained within logical blocks of a logical space to files, wherein each of the logical blocks has boundaries that are is aligned with the super block boundaries of at least one super block of the NVM, the file system allocator operative to:
- receive a request to store data associated with a file in the NVM;
- select a logical block as a current logical block based at least in part on a number of free sectors associated with the logical block, wherein the free sectors within the selected logical block are randomly distributed at non-contiguous physical locations;
- allocate, in a sequential order, at least a portion of the free sectors of the current logical block to the file; and
- write the data to the free sectors based on the sequential order so that a write access pattern is optimized for the selected block even though the sectors are randomly distributed within the super blocks.

11. The system of claim 10, wherein the file system allocator is operative to:
- determine that the system has logical blocks that are constant in size; and
- select the logical block that has a largest number of free sectors.

12. The system of claim 10, wherein the file system allocator is operative to:
- determine that the system has logical blocks that are variable in size; and
- select the logical block that has a largest ratio of free space to total space.

13. The system of claim 10, wherein the NVM comprises a NAND flash memory.

14. The system of claim 10, wherein the free sectors are non-contiguous.

15. The method of claim 10, wherein the free sectors are selected from contiguous and non-contiguous sectors within the logical block.

16. The system of claim 10, wherein the file system allocator is operative to:
- allocate a first free sector of the current logical block to the file;
- determine that additional free sectors are needed;
- determine if a new logical block is needed; and
- in response to determining that a new logical block is not needed, allocate a second sector of the free sectors of the current logical block to the file.

17. The system of claim 16, wherein the file system allocator is operative to determine that a new logical block is not needed based on determining that an allocation point has not reached the number of free sectors in the current logical block.

18. The system of claim 16, wherein the file system allocator is operative to determine that a new logical block is not needed based on failing to detect an end of the current logical block.

19. The system of claim 16, wherein the file system allocator is operative to determine that a new logical block is not needed based on detecting additional free space in the current logical block.

20. The system of claim 16, wherein in response to determining that a new logical block is needed, the file system allocator is operative to:
- select a new logical block as the current logical block based at least in part on a number of free sectors associated with the new logical block; and
- allocate at least a portion of the free sectors of the new logical block to the file.

21. The system of claim 10, wherein the file system allocator is operative to maintain an array of a number of free sectors corresponding to each logical block of the logical space.

22. The system of claim 21, wherein the array is an array of integers.

* * * * *